Oct. 20, 1959 — C. J. ARNDT — 2,908,958
LOCKING DEVICE FOR IDLER ASSEMBLIES OF ROPE
STRAND SUPPORTED ENDLESS CONVEYORS
Filed Oct. 8, 1957 — 2 Sheets-Sheet 1
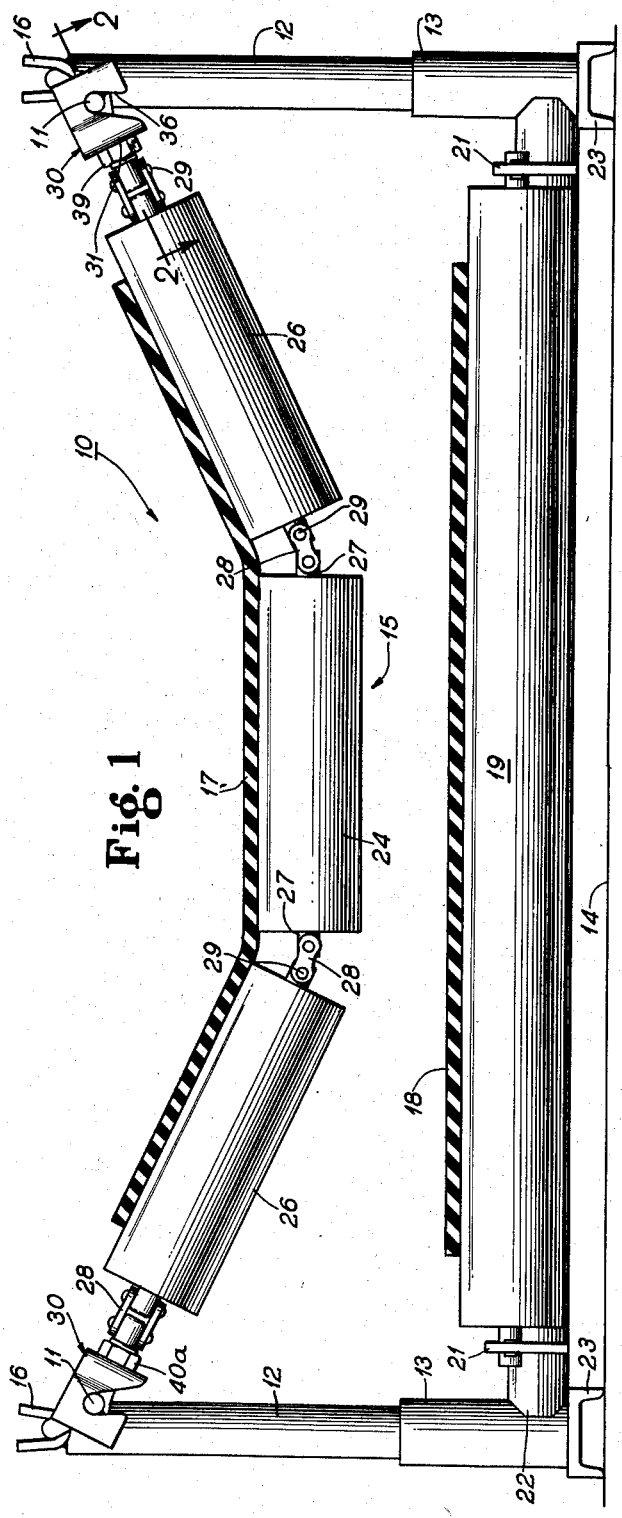
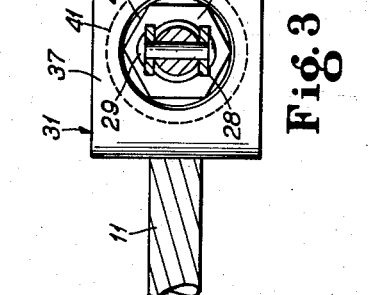
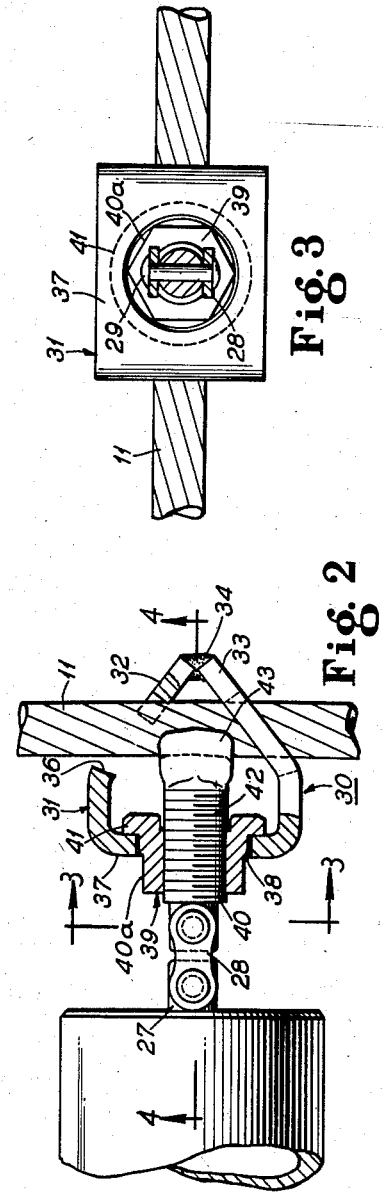
INVENTOR.
Charles J. Arndt
BY
*Murray A. Gleeson*
ATTORNEY Oct. 20, 1959   C. J. ARNDT   2,908,958
LOCKING DEVICE FOR IDLER ASSEMBLIES OF ROPE
STRAND SUPPORTED ENDLESS CONVEYORS
Filed Oct. 8, 1957   2 Sheets-Sheet 2

INVENTOR.
Charles J. Arndt
BY
Murray A. Gleeson
ATTORNEY sposed upon a strut 22 extending between the base
United States Patent Office 2,908,958
Patented Oct. 20, 1959

2,908,958

LOCKING DEVICE FOR IDLER ASSEMBLIES OF ROPE STRAND SUPPORTED ENDLESS CONVEYORS

Charles J. Arndt, Harvey, Ill., assignor to Goodman Manufacturing Company, Chicago, Ill., a corporation of Illinois Application October 8, 1957, Serial No. 688,915

4 Claims. (Cl. 24—125)

This invention relates generally to belt conveyors of the type where the load carrying reach is supported on spaced rope strands and more particularly to a locking device for the idler assemblies transmitting the load on the reach into the strands.

One of the principal objects of the invention is to provide an improved locking connection for the idler assemblies to the flexible support strands.

Another object is to provide a locking device of the character described capable of securing the idler assembly against movement along the support strands, yet capable of being readily disconnected as necessary.

Yet another object is to provide an assembly consisting of a troughing roller assembly and means for locking same to a flexible strand, yet so arranged that upon unlocking all the parts will maintain their assembled relationship.

Other objects and important features of the invention will be apparent from a study of the specification following taken with the drawings which together describe and illustrate a number of preferred embodiments of the invention and what are now considered to be the best modes of practicing the principles thereof. Other embodiments may be suggested to those having the benefit of the teachings herein, and such other embodiments are intended to be reserved especially as they fall within the scope of the subjoined claims.

In the drawings:

Fig. 1 is an elevational view of a troughing roller assembly for supporting the conveying reach of a belt conveyor of the type having rope strand side frames, said troughing roller assembly having means according to the present invention for locking the troughing roller assembly to the rope strands;

Fig. 2 is a sectional view taken along the line 2—2 of Fig. 1 looking in the direction of the arrows, certain parts being shown in elevation and showing details of the locking assembly according to one embodiment of the invention;

Fig. 3 is an elevational view looking in the direction of the arrows 3—3 of Fig. 2;

Figure 4:
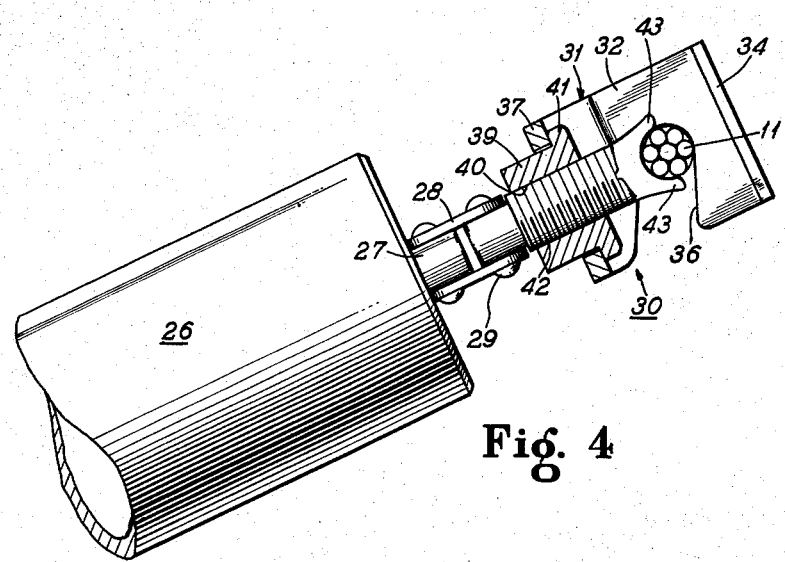
Fig. 4 is a sectional view taken along the line 4—4 of Fig. 2 and looking in the direction of the arrows.

Referring now to Fig. 1 of the drawings, there is shown an endless belt conveyor indicated generally by the reference numeral 10, said conveyor being of the type which is supported upon laterally spaced rope strands 11, these in turn being supported at intervals throughout their length upon standards 12 telescopically received in base supports 13, the standards 12 being capable of an adjustment by means not shown to accommodate irregularities in a mine floor 14. The top of each standard 12 is provided with a U-shaped saddle 16 receiving the rope strands 11.

A conveying reach 17 of the endless belt conveyor 10 is supported upon an idler assembly indicated generally by the reference numeral 15 and a return reach 18 thereof is guided upon an idler roller 19 supported at each end in a mounting bracket 21, said mounting bracket being disposed upon a strut 22 extending between the base supports 13. Each base support has a foot 23 resting upon the mine floor 14.

The idler assembly 15 consists of a center load supporting roller 24 flanked by inclined troughing or wing rollers 26. Each of the rollers turns upon a shaft 27 extending beyond the ends of the rollers 24 and 26, and the rollers are articulately connected together by means of links 28 having pin connections 29 to the shafts 27.

The idler assembly 15 is suspended between the spaced rope strands 11 by locking means according to the present invention and referred to generally by the reference numeral 30.

Locking means 30 includes a bracket 31 formed from a flat stamping and bent to have the triangular configuration seen in Fig. 2. Convergent sides 32 and 33 of the bracket 31 are joined by welding at their common vertex 34, and the sides 32 and 33 of the bracket 31 are provided with a slot 36 as seen in Fig. 1, so that the bracket can rest upon the rope strand 11. The base 37 of the bracket 31 has a circular opening 38 therein receiving a nut 39 having internal threads 40, an hexagonal surface 40a and a flange 41 bearing against the inner face of the base 37 as seen in Fig. 2. The nut 39 is threadably engaged with an exteriorly threaded member 42 which terminates within the bracket 31 in spaced jaws 43 engaging the rope strand 11, see Fig. 4. The opposite end of the member 42 is connected by the links 28 to the outer end of the shaft 27 of the wing roller 26, see Fig. 4.

In locking the assembly seen with reference to Figs. 1 to 4 inclusive to the rope strands 11 the nut 39 is turned in the proper direction to move the jaws 43 of the threaded member 42 against the rope strand 11, firmly engaging same against the sides of the slot 36, as seen in Fig. 2. It will be noted that the pressure of the member 42 against the rope strand 11 will elastically deform same to cause the strand to be gripped in the bracket 31.

It may be noted that the jaws 43 are larger than the threaded diameter of the nut 39, so that the retrograde movement of the member 42 is limited thereby, so that upon unlocking from the strand 11 the parts making up the assembly described cannot become separated.

Figure 5:
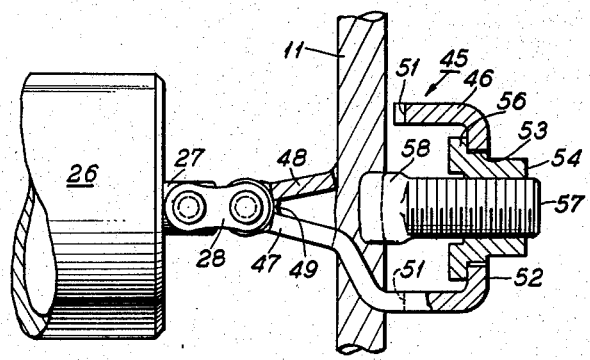
Fig. 5 is a view similar to Fig. 2, but showing another embodiment of the present invention.

Referring now to Fig. 5 of the drawings, there is shown another form of locking means indicated generally by the reference numeral 45. In this form of the invention there is shown a bracket 46, also having a cross section generally triangular in shape as with the embodiment seen in Fig. 2. The bracket 46 has convergent sides 47 and 48 which are welded together at their points of convergence as at 49. Each of the sides 47 and 48 has a slot 51 so that the bracket 46 can be placed upon the rope strand 11. The converging sides are continuous with a base 52 having a circular opening 53 and receiving a nut 54. A flange 56 on the nut 54 bears against the inner side of the base 52, and a threaded member 57 having jaws 58 threadably cooperates with the nut 54. The jaws 58 of the member 57 engage the rope strand 11 forcing it against the sides of the slot 51, in a manner similar to the embodiment with respect to Figs. 1 to 4 inclusive.

As with the embodiment of Figs. 1 to 4, the threaded member 57 is not separable from the bracket 46 thereby preventing loss of the parts of the alignment.

While the invention has been described in terms of a number of preferred embodiments thereof its scope is intended to be limited only by the claims here appended.

I claim as my invention:

1. A bracket means for suspending an elongated idler assembly between a pair of laterally spaced flexible strands of a flexible sideframe conveyor to enable such idler assembly to swivelably move as a unit, said bracket means being substantially triangular in configuration and defined by an elongated first side portion and a pair of elongated second side portions extending from spaced parts of the said first side portion in converging relationship to each other, said second side portions being joined to define an apex which is disposed in spaced relationship to the said first side portion, each of said second side portions having a slot open at the bottom to enable the bracket means to be positioned over a strand so that such strand will be disposed intermediate of and in spaced relationship to the apex and the said first side portion of the bracket means with the said second side portions being adapted to engage such strand at spaced locations therealong, an elongated member having a strand receiving jaw portion, means for movably mounting the member on the said first side portion in alignment with the apex for movement toward and from the apex so that the jaw portion of the member may engage a strand at a location thereon which is intermediate the spaced locations at which the said second side portions so engage such strand, whereby the engagement of the jaw portion of the elongated member with such strand intermediate the engagement of the said second side portions therewith will effectively provide a pivotal connection which will augment any unitary swiveling movement of such idler assembly.

2. The bracket means as set forth in claim 1 together with means carried by the said apex which is defined by the said second side portions for pivotally connecting the bracket means to an idler assembly.

3. The bracket means as set forth in claim 1 together with means carried by the elongated member for pivotally connecting the bracket means to an idler assembly.

4. The bracket means as set forth in claim 1 wherein said means for moveably mounting the member on the said first side portion includes exterior threads on the member, an opening in the said first side portion, and an interiorly threaded nut disposed within the said opening, said nut having a flange thereon in abutting engagement with the said first side portion with said exteriorly threaded member being in threading engagement with the interior threads of the nut.

References Cited in the file of this patent

UNITED STATES PATENTS

| | | |
|---|---|---|
| 261,296 | Berger | July 18, 1882 |
| 1,873,559 | Dibner | Aug. 23, 1932 |
| 2,530,299 | Hendley | Nov. 14, 1950 |
| 2,773,257 | Craggs et al. | Dec. 4, 1956 |
| 2,776,044 | Lo Presti | Jan. 1, 1957 |

FOREIGN PATENTS

| | | |
|---|---|---|
| 623,406 | Germany | Dec. 19, 1935 |